(12) United States Patent
Baran et al.

(10) Patent No.: US 11,035,824 B2
(45) Date of Patent: Jun. 15, 2021

(54) CLOSURE FOR AN ELECTROCHEMICAL VESSEL, ELECTROCHEMICAL VESSEL AND LABORATORY DEVICE

(71) Applicant: IKA-Werke GmbH & CO. KG, Staufen (DE)

(72) Inventors: Phil S. Baran, San Diego, CA (US); Evan Horn, San Diego, CA (US); Dirk Waldmann, Staufen (DE)

(73) Assignee: IKA-Werke GmbH & CO. KG, Staufen (DE)

( * ) Notice: Subject to any disclaimer, the term of this patent is extended or adjusted under 35 U.S.C. 154(b) by 0 days.

(21) Appl. No.: 16/852,886

(22) Filed: Apr. 20, 2020

(65) Prior Publication Data

US 2020/0292494 A1    Sep. 17, 2020

Related U.S. Application Data

(62) Division of application No. 15/422,571, filed on Feb. 2, 2017, now Pat. No. 10,656,118.

(51) Int. Cl.
*G01N 27/48* (2006.01)
*B01L 3/00* (2006.01)
*G01N 27/28* (2006.01)

(52) U.S. Cl.
CPC .............. *G01N 27/48* (2013.01); *B01L 3/508* (2013.01); *B01L 2200/026* (2013.01);
(Continued)

(58) Field of Classification Search
CPC .......... E05C 9/02; E05C 9/185; G06F 1/1616; G06F 1/1679; Y10T 292/00; G01N 27/283; G01N 27/48; B01L 2300/046; B01L 2300/0645; B01L 2300/04; B01L 2300/0609; B01L 2300/0627; B01L 2300/0851; B01L 3/508; B01L 2200/00; B01L 2200/02; B01L 2200/026
See application file for complete search history.

(56) References Cited

U.S. PATENT DOCUMENTS 2,776,257 A    1/1957  Cyril
4,322,279 A    3/1982  Piper et al.
(Continued)

FOREIGN PATENT DOCUMENTS

EP    0952448 A1    10/1999
WO    2009113250 A1    9/2009

OTHER PUBLICATIONS

International Search Report from PCT Application No. PCT/EP2018/052583, dated Jun. 21, 2018.
(Continued)

*Primary Examiner* — Gurpreet Kaur
(74) *Attorney, Agent, or Firm* — Budzyn IP Law, LLC

(57) ABSTRACT

The invention relates to a closure for an electrochemical reaction vessel, in particular a potentiostat, the closure comprising: a holder for holding electrodes arranged at an inner side of the closure such that, when the closure is attached to a reaction vessel, electrodes held by the holder extend into an interior space of the reaction vessel and into an electrolyte contained in the reaction vessel; and a plurality of contacts arranged at an outer side of the closure for providing electrical contacts with the electrodes.

28 Claims, 12 Drawing Sheets

(52) U.S. Cl.
CPC . *B01L 2300/046* (2013.01); *B01L 2300/0645* (2013.01); *B01L 2300/0851* (2013.01); *G01N 27/283* (2013.01)

(56) References Cited

U.S. PATENT DOCUMENTS

| | | | |
|---|---|---|---|
| 6,129,832 | A | 10/2000 | Fuhr et al. |
| 2002/0148728 | A1* | 10/2002 | Kumar .................. G01N 33/94 204/451 |
| 2003/0070917 | A1* | 4/2003 | Giaquinta .............. C25D 17/02 204/269 |
| 2004/0026233 | A1* | 2/2004 | Perrin ................. H01J 37/3405 204/192.12 |
| 2005/0221274 | A1* | 10/2005 | Negulescu ............ B01L 3/5085 435/4 |
| 2010/0012678 | A1 | 1/2010 | Gietenbruch et al. |
| 2010/0147232 | A1 | 6/2010 | Heath et al. |
| 2010/0264030 | A1 | 10/2010 | Arciniegas et al. |
| 2011/0159327 | A1 | 6/2011 | Hardwick et al. |
| 2014/0001058 | A1* | 1/2014 | Ghaffari ................. G01N 27/02 205/792 |
| 2014/0150537 | A1 | 6/2014 | Takeshita et al. |
| 2015/0043301 | A1 | 2/2015 | Demsia |
| 2015/0316500 | A1* | 11/2015 | Dale .................. G01N 33/5438 204/403.01 |
| 2017/0080422 | A1* | 3/2017 | Maaskant ............. B04B 5/0421 |
| 2017/0260488 | A1 | 9/2017 | Costa et al. |

OTHER PUBLICATIONS

PINE research, Compact Voltammetry, Nov. 2016.
PINE Research Instrumentation, Electrochemical Analysis of Acetaminophen in a Common Pain Relief Medication, Dec. 2016.

* cited by examiner

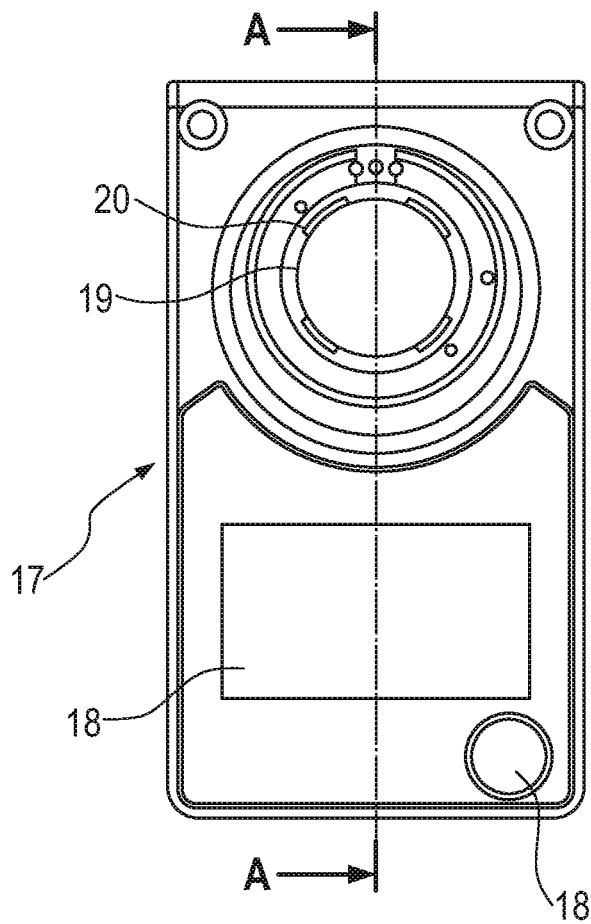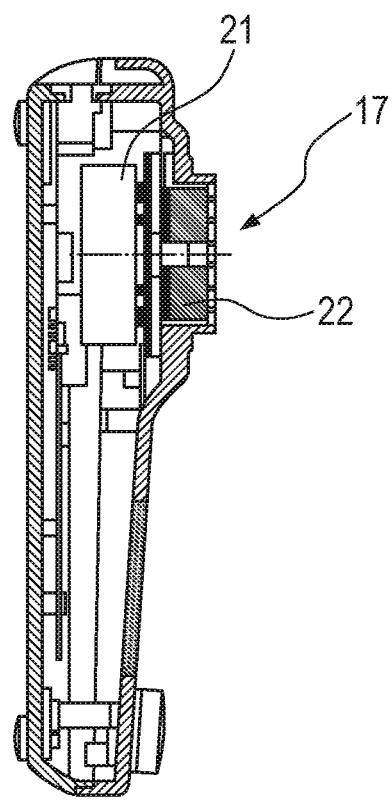
Fig. 3a    Fig. 3b
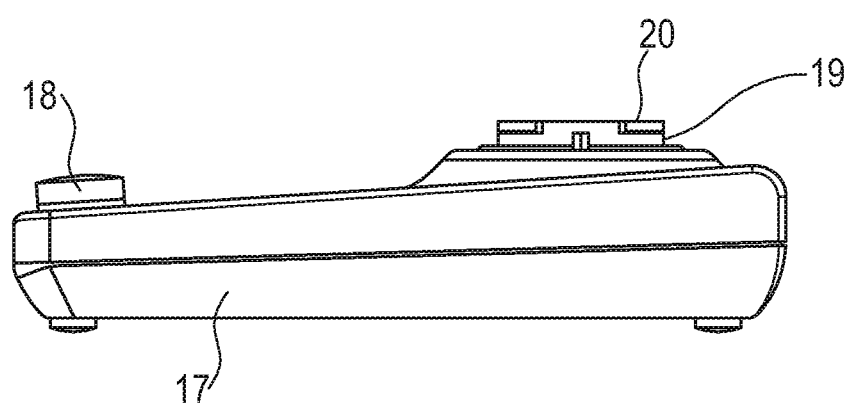
Fig. 4

CLOSURE FOR AN ELECTROCHEMICAL VESSEL, ELECTROCHEMICAL VESSEL AND LABORATORY DEVICE

CROSS-REFERENCE TO RELATED APPLICATION

This application is a division of U.S. patent application Ser. No. 15/422,571, filed on Feb. 2, 2017, now pending, the disclosure of which is hereby incorporated by reference in its entirety.

FIELD OF THE INVENTION

The present invention relates to a closure for an electrochemical vessel, an electrochemical vessel and a laboratory device.

BACKGROUND

It is known to use electrochemical reaction devices to perform chemical analyses. Such devices are required to enable precise measurements, making them complex and expensive.

Also, it is known to use electrochemical reaction devices to perform chemical reactions. In conventional devices, chemical reactions are controlled by using additives such as catalysts, reaction starters and reaction stoppers. Such conventional devices produce waste that needs to be disposed of.

Conventional devices are often cumbersome to operate. In particular, conventional devices are usually connected to and controlled by an external PC. It is not possible to operate the devices autonomously. Operation of the control software is often complex.

Furthermore, setting up conventional devices for operation can be inconvenient or even laborious. For example, connecting the electrodes of conventional electrochemical reaction vessel may require crocodile clips or suchlike.

The present invention aims to facilitate the performance of chemical reactions in a laboratory environment.

SUMMARY OF THE INVENTION

The present invention is recited in the independent claims. Optional features are recited in the dependent claims.

According to one aspect of the invention, there is provided a closure for an electrochemical reaction vessel, in particular a potentiostat, the closure comprising: a holder for holding electrodes arranged at an inner side of the closure such that, when the closure is attached to a reaction vessel, electrodes held by the holder extend into an interior space of the reaction vessel and into an electrolyte contained in the reaction vessel; and a plurality of contacts arranged at an outer side of the closure for providing electrical contacts with the electrodes.

The closure can be used to close a laboratory reaction vessel and to insert electrodes into the interior of the reaction vessel. The electrodes can be used to control electrochemical processes within the reaction vessel. In other words, the closure enables the use of a laboratory reaction vessel for electrochemical reactions. The reaction vessel when closed by the closure and filled with an electrolyte forms an electrochemical reaction vessel for applications in a laboratory environment. In an embodiment there are three electrodes, namely a reference electrode, a working electrode and a counter electrode.

In an embodiment the closure comprises a fastener for fastening the closure to the reaction vessel, in particular to seal the reaction vessel in a liquid- and/or gas-tight manner. The fastener can be operated to open and close the reaction vessel. The fastener and/or the closure can be arranged such that the reaction chamber within the vessel is sealed from the environment in a liquid- and/or gas-tight manner, thereby avoiding or reducing environmental influences on the electrochemical reactions. By sealing the vessel it is possible to perform reactions at predetermined atmospheric pressures, for example inert gas atmosphere.

In an embodiment the closure comprises a connector, in particular a connector with an internal thread, for engaging with a corresponding threaded connector, in particular an external thread, at the reaction vessel. In this embodiment, the closure is implemented as a screw closure which can be opened and closed easily, thus providing a user-friendly operation.

In an embodiment the closure comprises separate first and second parts, in particular radially inner and outer parts, wherein the first part comprises the holder and the plurality of contacts, and the second part comprises the fastener, wherein the second part when fastened to the reaction vessel causes the position of the first part with respect to the reaction vessel to be centered. In this embodiment, the first part can form a cylindrical inner part whose axis is aligned with the longitudinal axis of the reaction vessel when the closure is a fastened thereto. The second part can form a ring-shaped outer part that extends around the circumference of the inner part. For example, the second part is a union nut. The closure is fastened to the reaction vessel by fastening (e.g. screwing) the second part (e.g. the union nut) to the reaction vessel. Thereby, the first part is fixed in its position relative to the reaction vessel. In particular, the first part is centered with respect to the reaction vessel, thereby ensuring that the electrodes are located within predetermined positions with the reaction chamber formed by the vessel.

In another embodiment the closure is made in one piece.

In an embodiment, the holder comprises a plurality of holding elements, in particular threaded connectors or plug-in contacts, for removably attaching the electrodes to the closure. In this embodiment electrodes can be easily and firmly mounted to the holder by screwing or simply plugging the electrodes into the plug-in contacts. This facilitates the replacement of electrodes.

In an embodiment, the closure further comprises a channel for supplying a fluid to the interior space of the reaction vessel and/or retrieving a sample of a fluid contained in the interior space of the reaction vessel. The channel can be opened and closed independently of opening/closing the reaction vessel by opening/closing the closure. In this embodiment, reactants can be supplied to the reaction chamber i.e. the interior of the vessel during operation, i.e. while an electrochemical reaction takes place within the reaction chamber. Also, samples of the contents of the vessel can be retrieved for examination without having to interrupt operation.

In an embodiment the closure comprises attachment means to engage with corresponding holding means of a laboratory device, whereby a reaction vessel closed by the closure is attachable to a laboratory device. Accordingly, the means for attaching the reaction vessel to a laboratory device are integrated in the closure. Thereby, the closure can be used to convert existing (conventional) reaction vessels into electrochemical reaction vessels and to attach them to a corresponding laboratory device.

In an embodiment, the closure comprises at least one projection for adjusting or centering the position of the closure with respect to a holder of a laboratory device for holding a reaction vessel comprising the closure, wherein the at least one projection preferably extends axially from the outer side of the closure. The projection can be received by a corresponding holder of a laboratory device. The projection facilitates the mounting of a reaction vessel with the closure to a laboratory device. At the same time the projection ensures that the reaction vessel is arranged at a predetermined position with respect to the laboratory device.

In an embodiment, the closure further comprises a channel for receiving an electrode, the channel extending from the inner side to the outer side of the closure, and in particular comprising an electrode extending through the channel and projecting from the closure at the inner side and the outer side. In operation, i.e. when the closure is attached to a reaction vessel, the electrode extends from within the reaction chamber to the outside of the reaction vessel. The portion of the electrode that projects from the outer side of the closure can be used to attach the closure (and the reaction vessel) to a laboratory device. It can also serve as a centering projection so that no separate centering projection is required. The portion of the electrode that projects from the inner side of the closure is in contact with an electrolyte contained in the reaction vessel.

In an embodiment the contacts are arranged laterally, in particular at a circumferential outer surface of the closure. In this embodiment, the electrical connection between the laboratory device and the reaction vessel can be established through the respective lateral surfaces of the closure and the laboratory device that engage with one another when the closure with the reaction vessel is mounted to the holder of the laboratory device.

According to another aspect of the invention, there is provided an electrochemical reaction vessel for a laboratory device, in particular a potentiostat, the reaction vessel comprising a closure in accordance with any of the embodiments described above.

According to another aspect of the present invention, there is provided an electrochemical reaction vessel for a laboratory device, in particular a potentiostat, the reaction vessel comprising: a plurality of electrodes extending into an interior space of the reaction vessel; and a plurality of contacts arranged at an outer side of the reaction vessel for providing electrical contact with the electrodes at the outer side of the reaction vessel.

Accordingly, the electrochemical reaction vessel comprises integrated electrodes that enable the control of electrochemical processes within an electrochemical reaction chamber formed by the vessel. In this embodiment it is not necessary to arrange the electrodes and contacts at the vessel's closure.

This embodiment enables the provision of disposable or single-use reaction vessels. All necessary electrical elements may be integrated in the vessel.

In an embodiment, the electrodes are arranged at a bottom portion of the reaction vessel, and the contacts are arranged at an outer bottom side of the reaction vessel. In this embodiment the reaction vessel is adapted to be placed on a support surface of a laboratory device having corresponding counter-contacts integrated in the support surface. Thus, the reaction vessel can easily be inserted in and removed from an electrochemical laboratory device that is adapted accordingly.

According to another aspect of the present invention there is provided a laboratory device comprising: at least one electrochemical reaction vessel in accordance with any of the embodiments described above, and a holder or support for receiving the reaction vessel. In embodiments of the inventions, there may be provided multiple of such electrochemical reaction vessels, enabling the simultaneous performance of multiple electrochemical reactions in a laboratory environment under the same or different electrochemical conditions.

In an embodiment the holder or support is adjustable to hold a reaction vessel of different dimensions. The holder or support may be implemented as a fastener or clamp that automatically adjusts to the size of the closure. The holder or support may be implemented as a top down holder.

In an embodiment the holder or support comprises a plurality of holding elements, each adjustable to hold a reaction vessel of different dimensions. Accordingly, the laboratory device may simultaneously accommodate different reaction vessels and perform different electrochemical processes.

In an embodiment, the holder or support comprises contacts, in particular spring-loaded contacts, for electrically contacting the contacts of the reaction vessel. The contacts in the holder or support serve to establish an electrical connection between the reaction vessel and a control device which may be included in the laboratory device. By providing spring-loaded contacts, a reliable electrical connection is provided.

In an embodiment, the electrical contacts are arranged at a lateral surface of the holder or support to engage with said laterally arranged contacts of the closure. In this embodiment, the closure with the reaction vessel can be mounted laterally to the holder or support, wherein the electrical connection between the laboratory device and the reaction vessel can be established through the junction of the closure and the holder or support.

In an embodiment, the holder or support comprises a foldable member comprising the contacts, the contacts arranged in the foldable member to electrically contact the contacts of the reaction vessel by folding the foldable member into an operating position. The foldable member enables the establishment of an electrical connection between the reaction vessel and the laboratory device independently of the fastening of the reaction vessel to the laboratory device.

In an embodiment, the holder or support comprises a support surface for receiving the reaction vessel, wherein the support surface comprises contacts for electrically contacting the contacts of the reaction vessel, in particular contacts at the underside of the reaction vessel, and/or comprising means for attaching the reaction vessel to the support surface, in particular first attachment means at the underside of the reaction vessel to engage with corresponding or complementary second attachment means at the support surface. In this embodiment the electrical connection can be established simply by placing the reaction vessel on the support surface.

In an embodiment, the holder or support and/or the closure comprises one or more magnets for attaching the reaction vessel to the holder or support. Accordingly, the reaction vessel can be easily mounted to and removed from the holder of the laboratory device.

In an embodiment the laboratory device comprises a magnetic stirrer for mixing an electrolyte contained in the reaction vessel, wherein the magnetic stirrer may be included in the holder or support. This embodiment enables the mixing of the contents of the reaction chamber during operation.

In an embodiment the laboratory device comprises a control device connected or connectable to the electrodes via the contacts, the control device to control electrochemical processes or reactions within the reaction vessel during operation of the laboratory device. The control device enables the control of electrochemical reactions within the electrochemical chamber(s) by controlling the potentials applied to the electrodes. No chemical additives are required. For example, it is possible to control the voltages and/or currents supplied to the electrodes, thereby controlling the electric charge supplied to the reactants in the reaction vessel. In addition, the control device enables controlling of other parameters such as the rotation, in particular the rotation speed of a magnetic stirrer. The control device may include a display to indicate parameter values in respect of the electrochemical reaction.

The laboratory device may also be used to perform electrochemical analyses to obtain analytical data. For example, the laboratory device may be used to perform cyclic voltammetry.

By providing a control device that is integrated in the laboratory device, it is possible to operate the laboratory device autonomously without having to connect it to an external PC (although this may additionally be enabled).

The control device may include and be controlled by a control software. The control device may comprise one or more of a number of interfaces for updating the control software. In particular, the interface may comprise a USB port, a Bluetooth connection, and/or a WIFI connection. The interface may be used to update existing control software, and/or to upload new software to control and perform different electrochemical processes or analyses.

In an embodiment, the laboratory comprises a plurality of support surfaces each for receiving a respective reaction vessel or multi-vial adapter. In this embodiment it is possible to operate a high number of reaction vessels, e.g. up to 50 or more, at the same time.

BRIEF DESCRIPTION OF THE DRAWINGS

FIGS. 3a, 3b and 4 illustrate different views of a laboratory device in accordance with an embodiment of the present invention.

DESCRIPTION OF EMBODIMENTS

Figure 1:
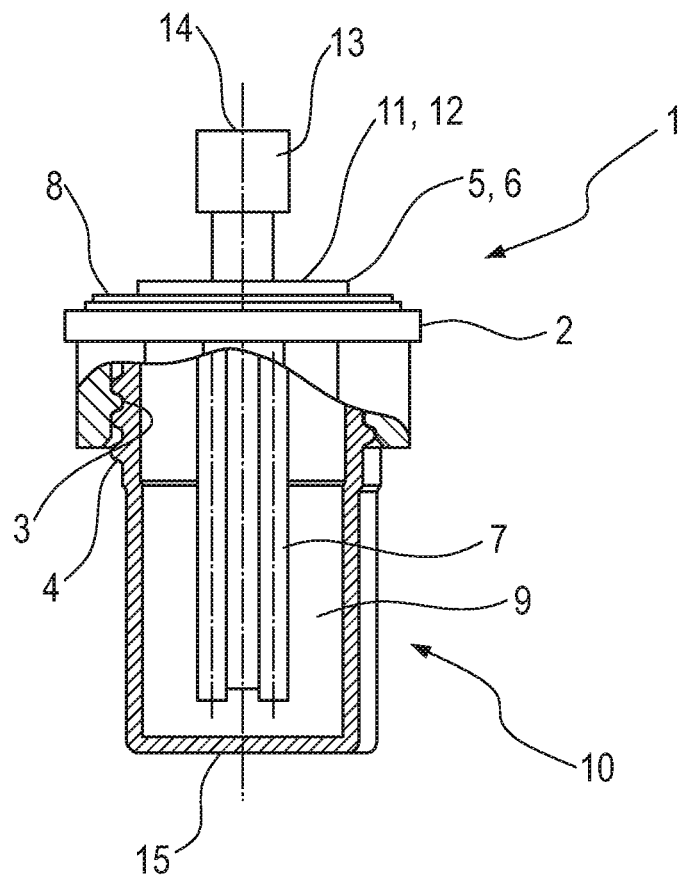
FIG. 1 illustrates an electrochemical reaction vessel in accordance with an embodiment of the present invention.
Figure 2A:
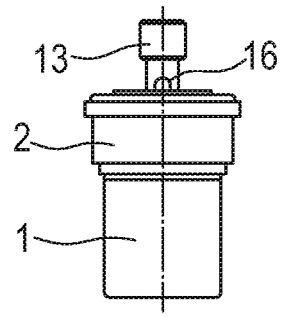
FIGS. 2a to 2d illustrate different electrochemical reaction vessels in accordance with embodiments of the present invention.
Figure 2A:
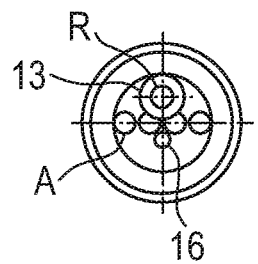
Figure 2B:
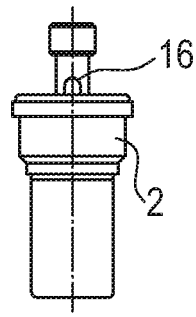
Figure 2B:
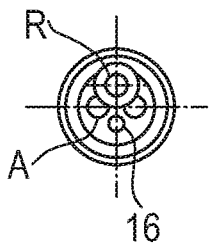
Figure 2C:
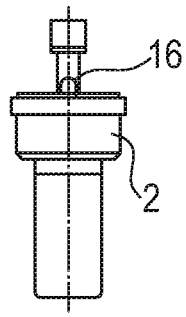
Figure 2C:
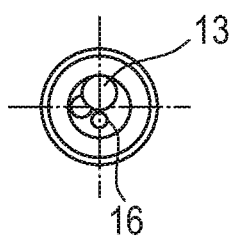
Figure 2D:
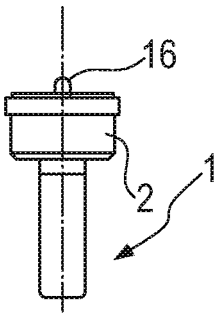
Figure 2D:
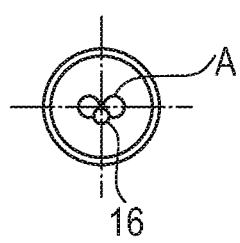

FIG. 1 illustrates an electrochemical reaction vessel 1 comprising a closure 2 in accordance with an embodiment of the present invention. The vessel 1 is cylindrical. The closure 2 is attached to the vessel 1 by means of a threaded connection. In particular, the threaded connection comprises an interior thread 3 at the inside of the closure 2, and a corresponding exterior thread 5 at the vessel 1.

An electrode holder 5 is arranged at an inner side 8 of the closure 2. The holder 5 comprises a plurality of holding elements 6. Each of the holding elements 6 comprises an exterior thread that allows electrodes 7 to be screwed onto the respective holding elements 6.

The holding elements 6 are arranged on the inner side 8 of the closure 2 such that the electrodes 7 extend into an interior 9 of the vessel 1 when screwed onto the holding elements 6. In an operational state when the vessel is filled with an electrolyte and the closure 2 is attached to the vessel 1, the electrodes 7 extend into the electrolyte.

The vessel 1 with the closure 2, the electrodes 7 and the electrolyte forms an electrochemical cell. In the illustrated embodiment with three electrodes 7, the vessel 1, the closure 2, the electrodes 7 and the electrolyte together form a potentiostat.

The electrodes 7 are electrically connected with contacts 11 at an outer side 12 of the closure 2. In addition, the closure 2 comprises a hose connector 13 for supplying a fluid, in particular a liquid into and/or for extracting content from vessel 1. This can be done before, during or after the reaction. The hose connector can be closed by a closure, e.g. a lid 14.

In an operating position, there is a gap between the ends of the electrodes and the bottom of the vessel 1 large enough to accommodate a stirring element (not shown), in particular a stir bar of a magnetic stirrer.

FIGS. 2a to 2d illustrate different embodiments of the electrochemical reaction vessel 1 with closures 2. In each of the embodiments there are three electrodes, namely a reference electrode R and two working electrodes A arranged next to one another. Also, the closure 2 comprises a centering projection 16. The embodiments differ from one another in that the vessels 1 have different volumes, e.g. 50 ml (a), 20 ml (b), 10 ml (c) and 5 ml (d).

FIGS. 3a, 3b and 4 illustrate a laboratory device 17 in accordance with an embodiment of the present invention. FIG. 3a illustrates a view from above while FIG. 3b illustrates a cross-section of the laboratory device 17 along the line C-C. On the top surface of the laboratory device 17, control elements 18 are provided to enable a user to control operation of the laboratory device 17. In addition, there is a support surface 19 on which the vessel 1 can be placed. The support surface 19 comprises holding or latch elements 20 for fixing the vessel 1 or a holder or adapter associated with the vessel 1, and contacts for the three electrodes (reference electrode R and working electrodes A).

The laboratory device 17 comprises a drive engine 21 for driving a stirring magnet 22. The stirring magnet 22 in turn drives a stir bar (not shown) provided within the vessel 1.

FIG. 4 illustrates a side view of the laboratory device. As shown in this Figure, the holding and latch element 20 is ring-shaped and extends vertically from the support surface 19.

Figure 5:
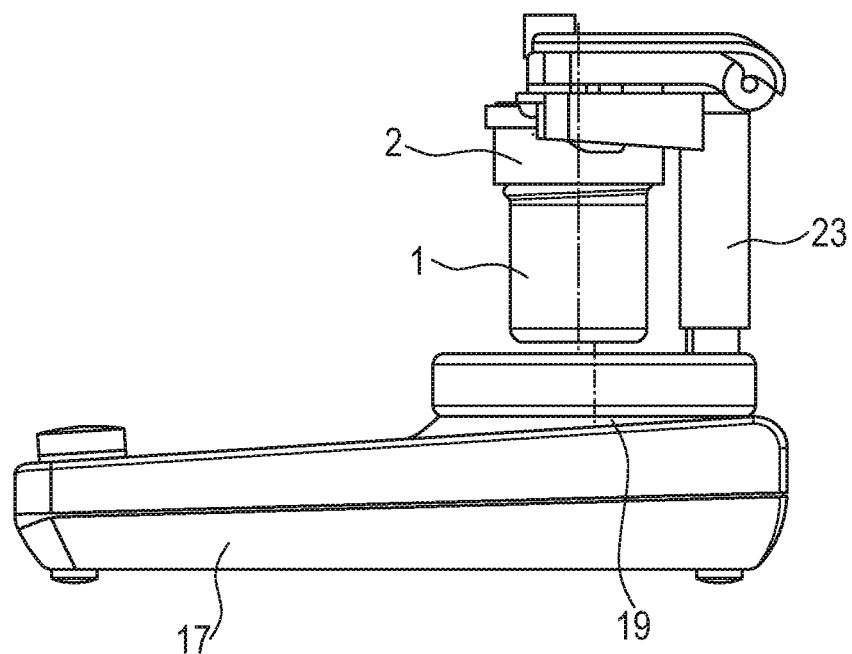
FIGS. 5, 6a and 6b illustrate different views of a laboratory device in accordance with another embodiment of the present invention.

FIG. 5 illustrates another embodiment of the laboratory device 17 comprising the reaction vessel 1 closed by the closure 2. In this embodiment, the reaction vessel 1 is held above the support surface 19 by a holder 23. In particular, the reaction vessel 2 is held such that its longitudinal axis is aligned with a rotation axis of the stir magnet 22. The holder 23 is mounted to the support surface 19.

The holder 23 comprises contacts to connect the electrodes 7 in the closure 2 and the vessel 1 with the laboratory device 17.

Figure 6A:
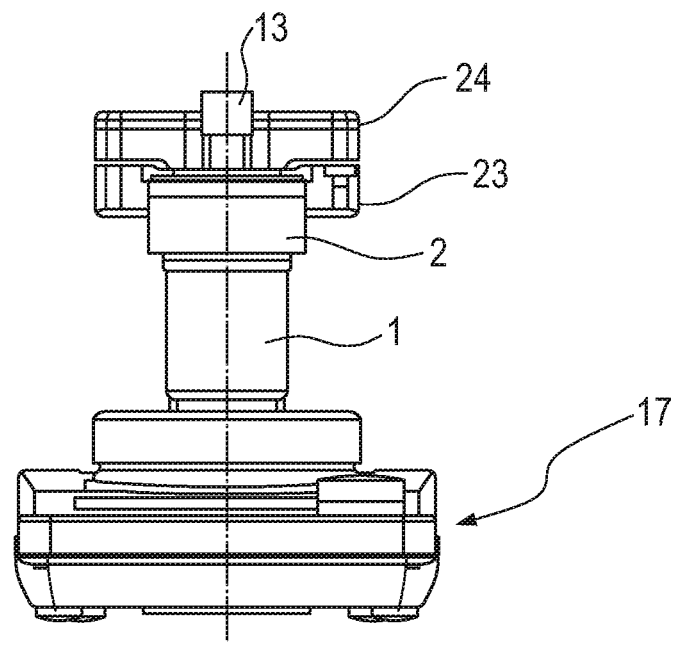
Figure 6B:
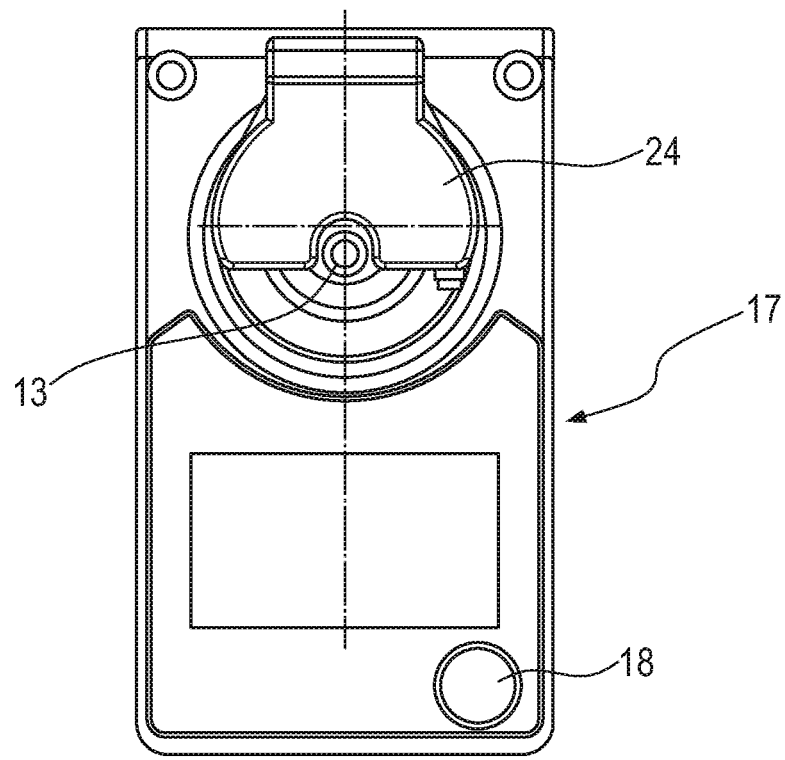

FIGS. 6a and 6b illustrate side and top views of the laboratory device 17 of FIG. 5, respectively. FIG. 6a shows that the reaction vessel 1 is supported and held by the holder 23. The holder 23 includes a fastener, e.g. a clamp, to engage with the closure 2, thereby attaching the reaction vessel 1 to the laboratory device 17. The fastener may be adjustable to receive closures 2 of different sizes.

The holder 23 has a recess 25 in which a centering projection is received, thereby centering the reaction vessel 1 with respect to the laboratory device 17. In an embodiment the holder 23 holds the reaction vessel 1 slightly above the support surface 19 so that there is a distance between the bottom of the reaction vessel 1 and the support surface. However, in an alternative embodiment the vessel 1 rests on the support surface.

The holder comprises a foldable top portion 24 including contacts (not shown) for electrically contacting the contacts 11 at the outer side 12 of the closure 2. In operation, the top portion 24 is folded upwardly when the centering projection is inserted into the recess 25. Thereafter, the top portion 24 is folded back downwardly, whereby the contacts of the top portion 24 are brought into contact with the contacts 11 of the closure. The contacts of the top portion 24 may be spring-loaded to ensure that a reliable electrical connection is formed with the contacts 11.

Figure 7:
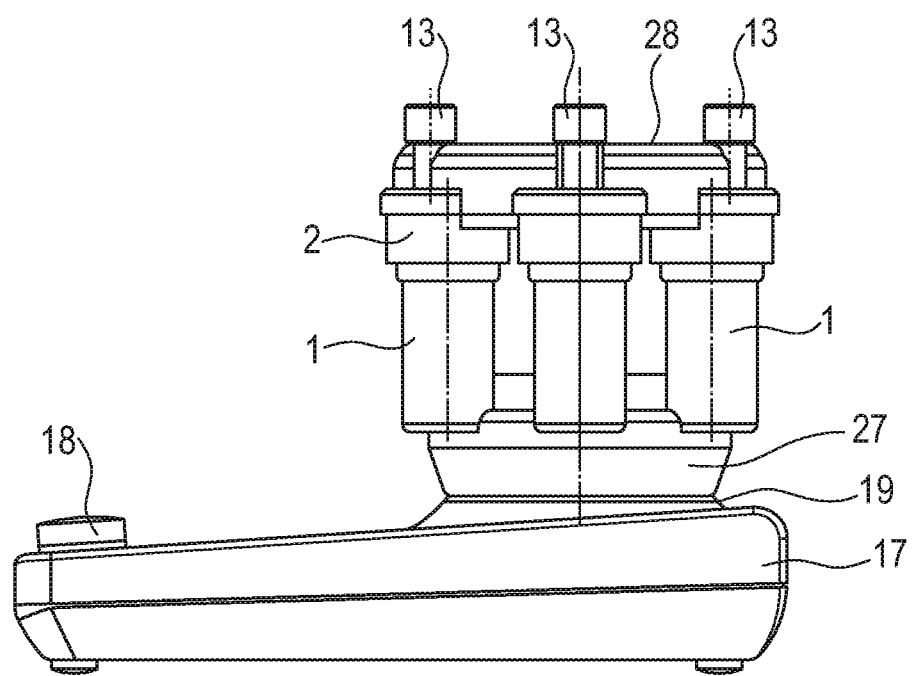
FIGS. 7, 8a and 8b illustrate different views of a laboratory device in accordance with another embodiment of the present invention.
Figure 8A:
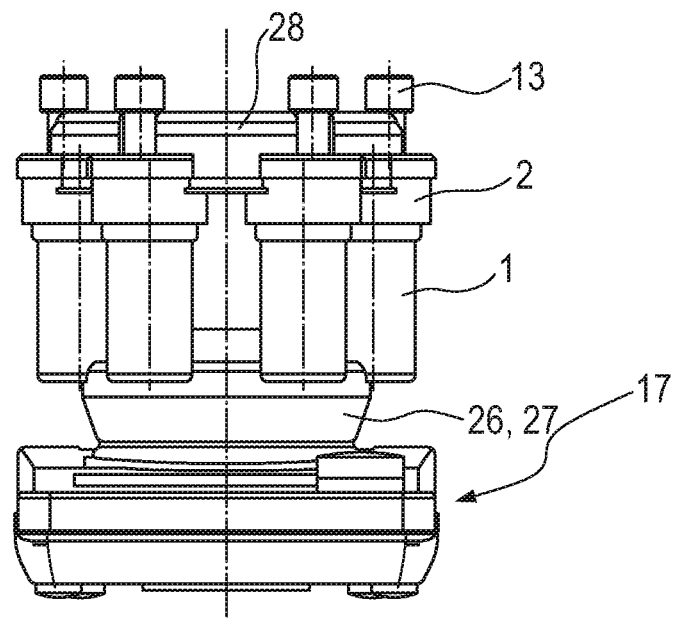
Figure 8B:
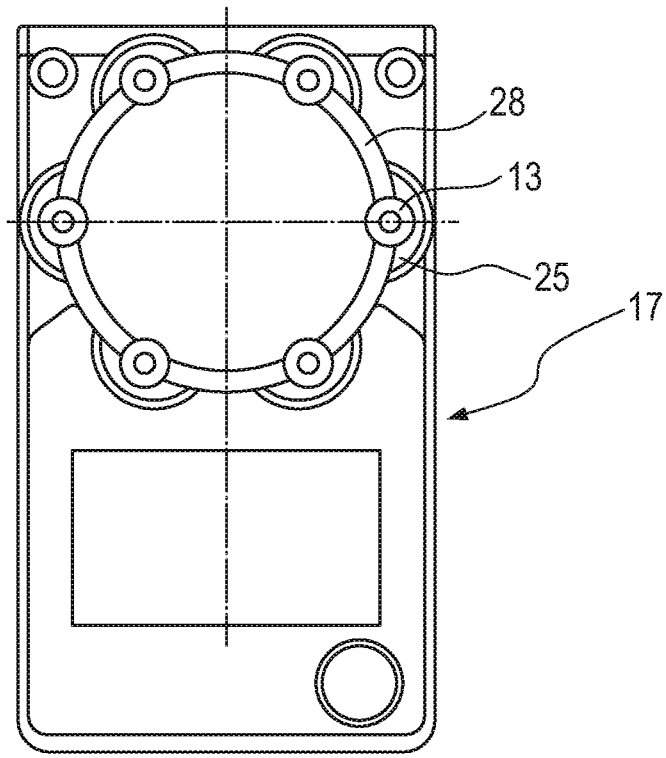

FIGS. 7, 8a and 8b illustrate further embodiments of the laboratory device 17. In the embodiment of FIGS. 7 and 8a, a plurality of reaction vessels 1 is held by a multi-vial adapter 26. The adapter 26 comprises a lower portion 27 and an upper portion 28. At the upper portion, the reaction vessels 1 are mounted to the laboratory device 17 through holding means that essentially function in the same manner as the holder 23. In particular, the closure 2 of each of the reaction vessels 1 is mounted to a respective holding element. Also, the upper adapter portion 28 comprises recesses 25 for receiving centering projections of the reaction vessels 1. The contacts 11 at the closures 2 are contacted by respective counter contacts (not shown) in the upper portion 28. The counter contacts are electrically connected with a control device in the laboratory device 17.

The holding means of the adapter may be adjustable to accommodate closures of different sizes. Accordingly, it is possible to mount differently dimensioned reaction vessels to the laboratory device 17.

FIG. 8b illustrates a top view of the laboratory device 17 of FIGS. 7 and 8a. The adapter 26 holds six reaction vessels 1. The recesses 25 in the upper adapter portion 28 engage with centering projections of the closures 2 and fix the position of the reaction vessels 1 with respect to the laboratory device 17.

The reaction vessel 1 is made of a material suitable for electrochemical reactions, e.g. glass or a plastic material.

Figure 9A:
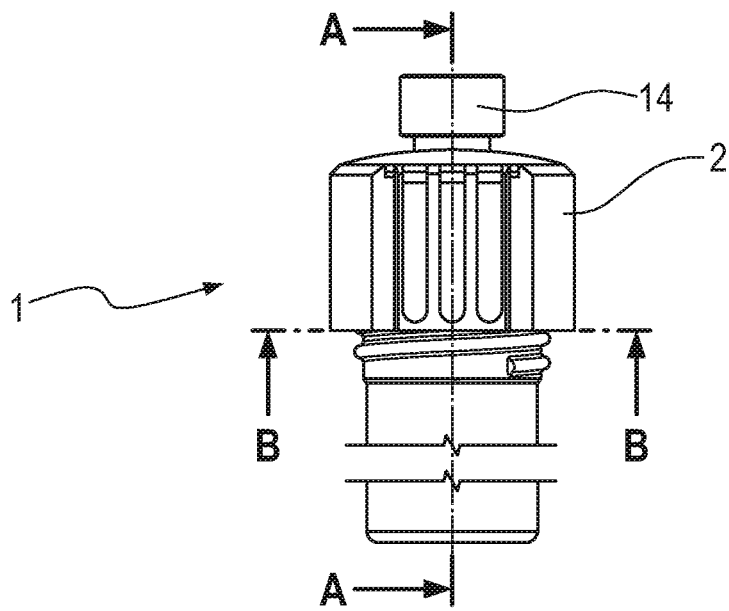
FIGS. 9a-9c illustrate an electrochemical reaction vessel 1 in accordance with another embodiment of the present invention.
Figure 9B:
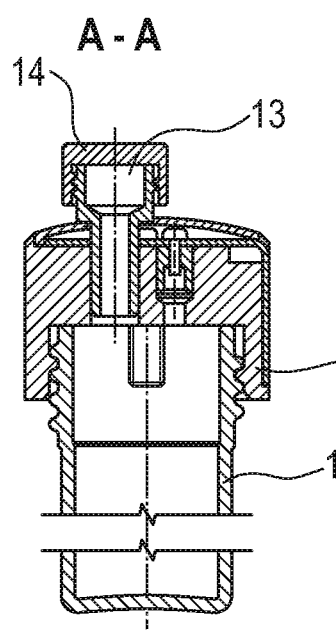
Figure 9C:
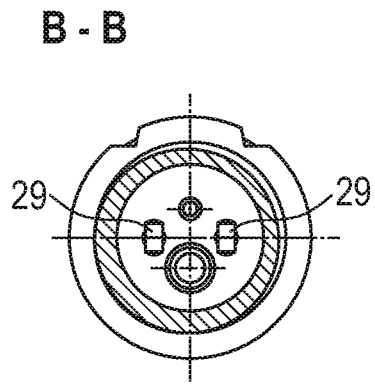

FIG. 9a illustrates an electrochemical reaction vessel 1 in accordance with another embodiment. FIG. 9b illustrates a cross section along A-A in FIG. 9a, and FIG. 9c illustrates a cross section along B-B in FIG. 9a.

In this embodiment, the closure 2 comprises plug-in contacts 29 for receiving the electrodes 7. The electrodes 7 can be mounted to the closure 2 simply by plugging them into the plug-in contacts 29. Also, in this embodiment, the closure 2 is made in one piece.

Figure 10B:
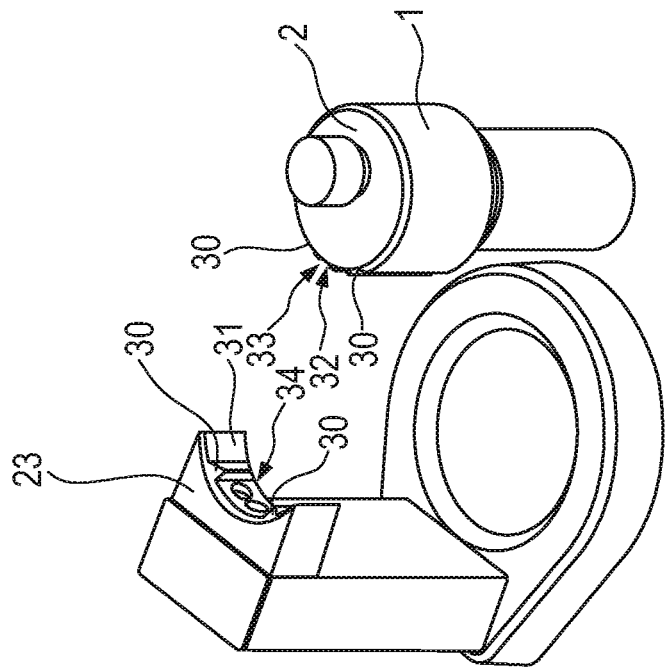
FIGS. 10a and 10b illustrate different views of a laboratory device in accordance with another embodiment of the present invention.
Figure 10A:
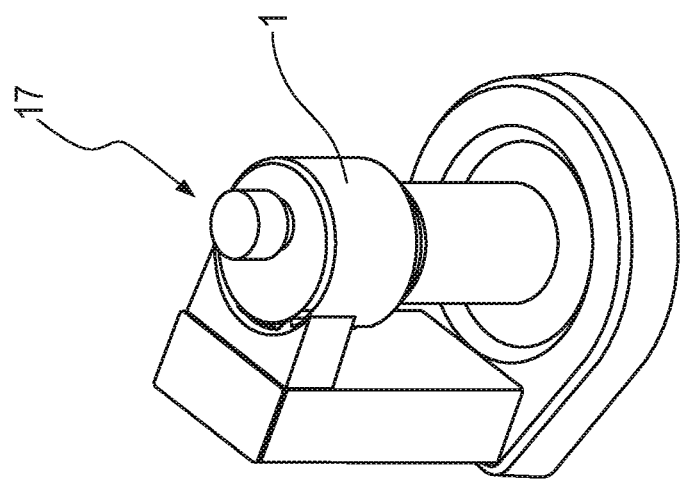
Figure 11D:
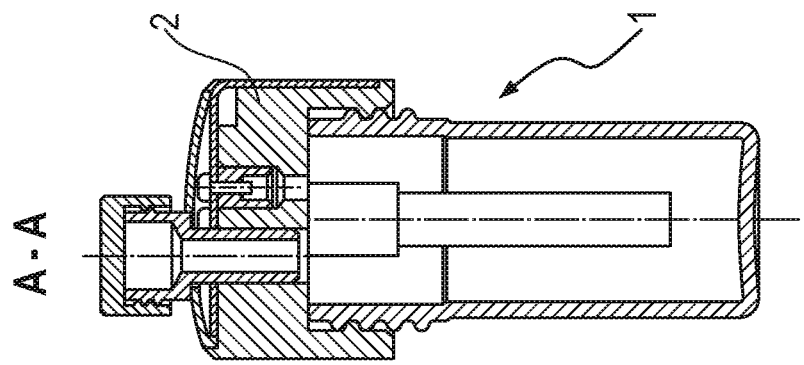
FIGS. 11a-d illustrate different views of a reaction vessel with lateral electrical contacts in accordance with an embodiment of the invention.
Figure 11C:
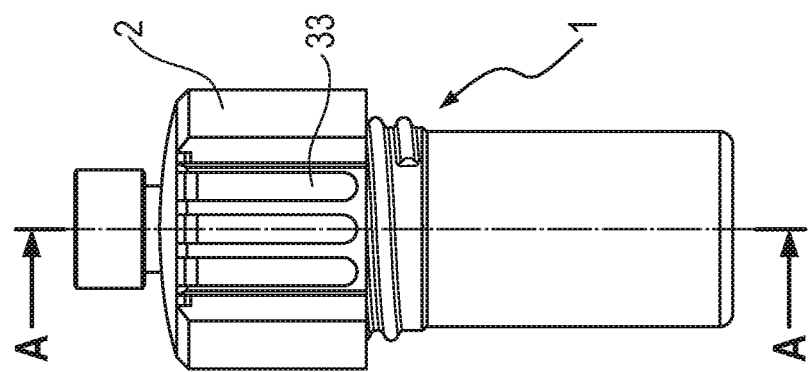
Figure 11B:
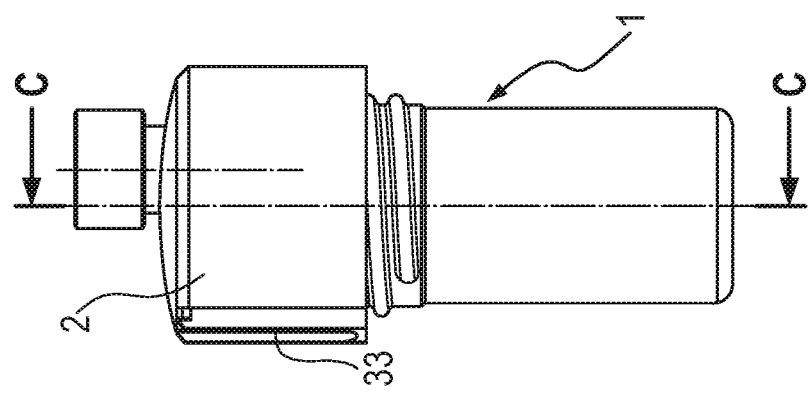
Figure 11A:
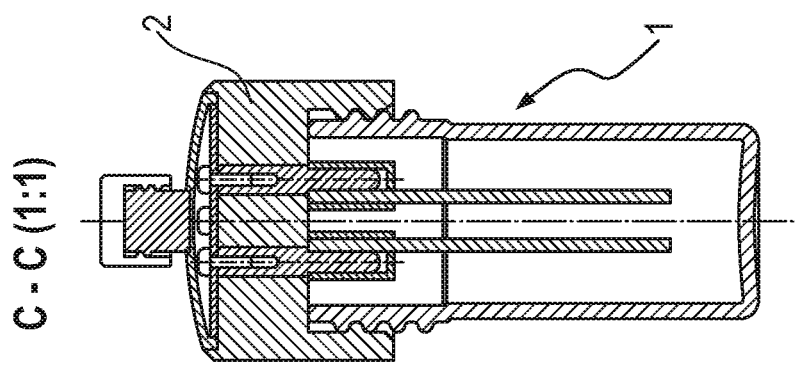

FIGS. 10a and 10b illustrate a laboratory device 17 in accordance with another embodiment of the present invention. In this embodiment, the reaction vessel 1 is mounted to the holder 23 by magnetic force. For this purpose, magnets 30 are arranged at a top portion 31 of the holder 23 and/or an opposite top portion 32 of the closure 2. The magnets 30 serve to hold and to center the position of the reaction vessel 1 within the laboratory device 17. The top portions 31, 32 of the holder 23 and the closure 2, respectively, have complementary shapes and engage with one another at respective circumferential engagement surfaces 33 and 34.

Electrical contacts 35, 36 are arranged at the circumferential engagement 33, 34, respectively. In other words, the electrical contacts are arranged as lateral contacts facing sideways, i.e. radially outward with respect to the rotational axis of the cylindrical reaction vessel 1. When the closure 2 is mounted to the holder 23, the electrical contacts 35, 36 engage with one another, thereby providing an electrical connection between the electrodes of the reaction vessel 1 and an electrical power supply of the laboratory device 17.

FIG. 11 illustrates the reaction vessel according to the embodiment with lateral contacts 33, as described in connection with FIG. 10.

Figures 12A, 12B:
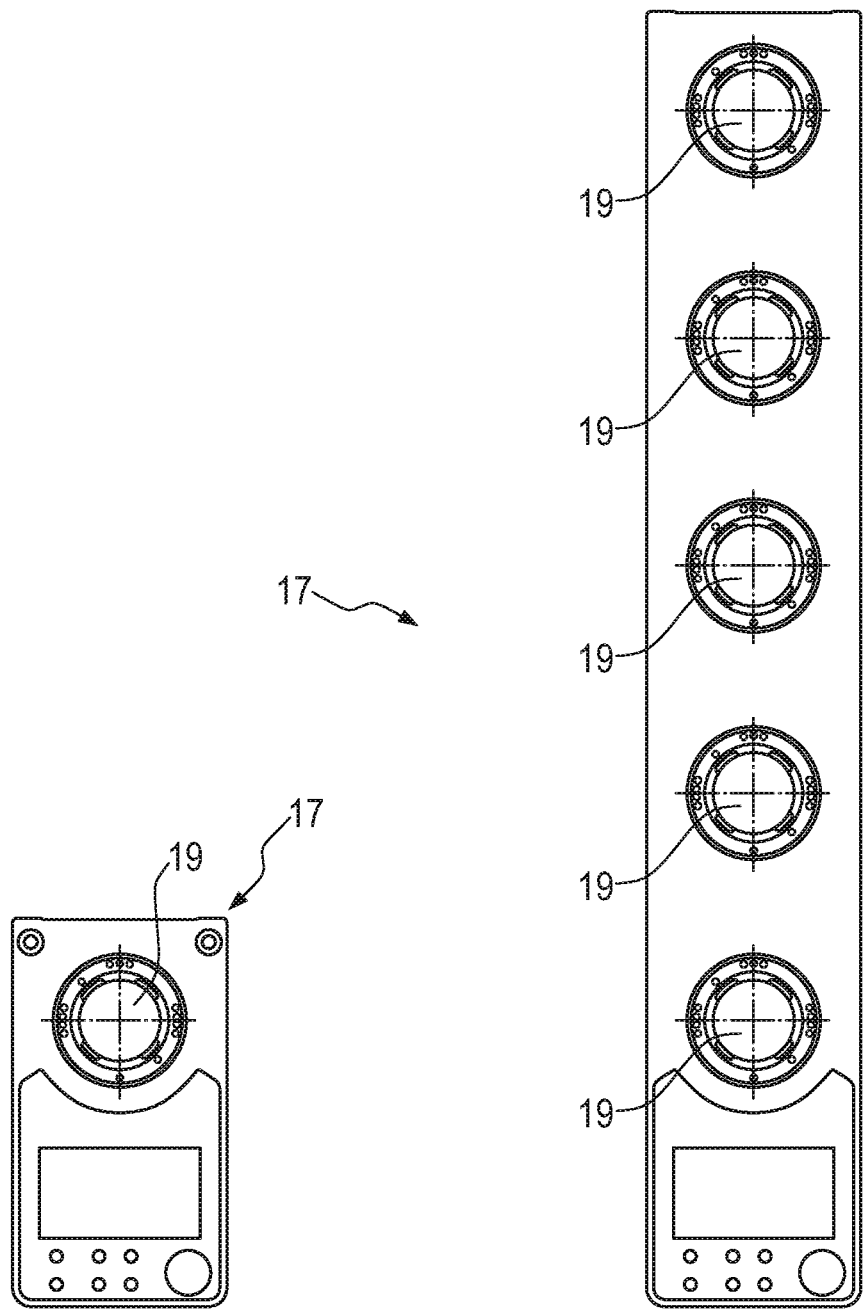
FIGS. 12a and 12b illustrate a top view of laboratory devices in accordance with two alternative embodiments of the invention.

FIG. 12a illustrates a top view of a laboratory device 17 in accordance with an embodiment of the invention. This embodiment essentially corresponds to the embodiment of FIG. 3 and comprises a single support surface 19 for receiving a single reaction vessel 1. Alternatively, a plurality of reaction vessels 1 may be supported by means of a multi-vial adapter 26 such as shown in FIGS. 7 and 8. In a particular embodiment, up to six test vials may be arranged.

FIG. 12b illustrates a top view of a laboratory device 17 in accordance with an alternative embodiment of the invention. In this embodiment there are multiple support surfaces 19. Each of the support surfaces can receive a reaction vessel 1 or a multi-vial adapter 26 such as shown in FIGS. 7 and 8. In the illustrated example, the laboratory device is arranged to be operated with up to 30 vials (five vials on each support surface).

Figure 13:
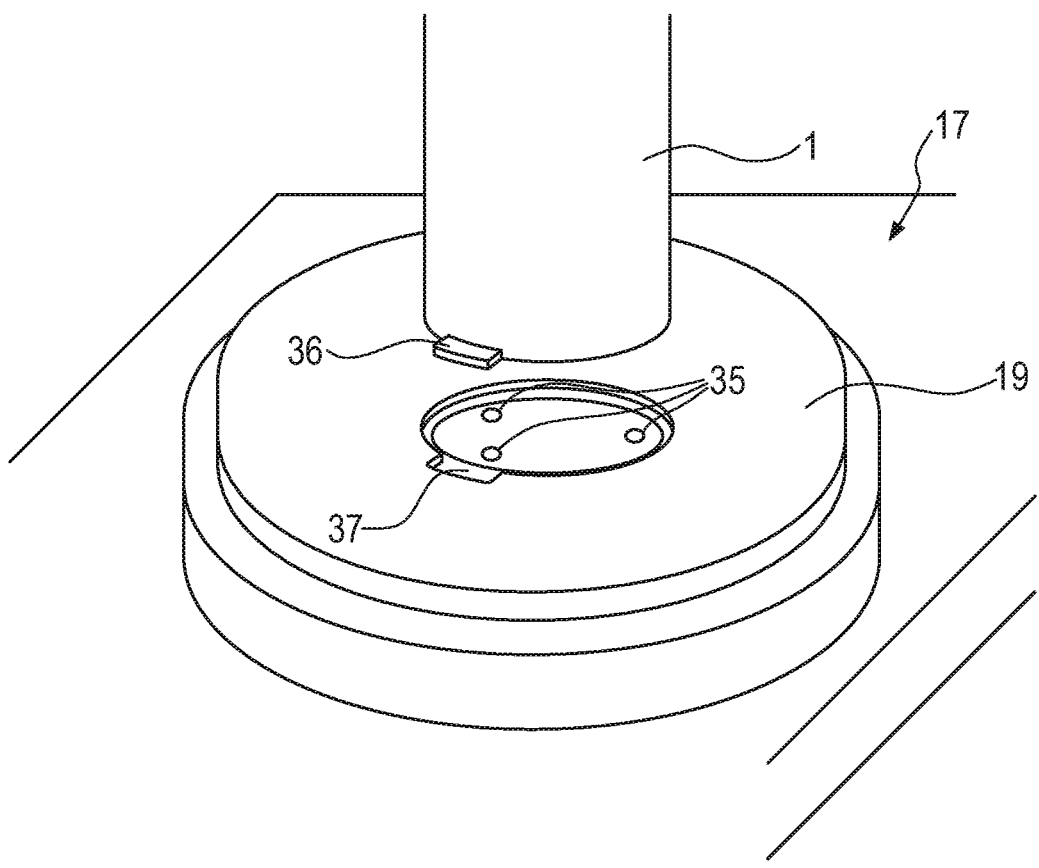
FIG. 13 illustrates schematically a portion of a laboratory device in accordance with an embodiment of the invention.

FIG. 13 illustrates schematically a portion of a laboratory device 17 in accordance with an embodiment of the invention. In this embodiment the support surface 19 is arranged to receive and support the reaction vessel 1. The support surface comprises electrical contacts 35 to engage with corresponding electrical contacts at the underside of the reaction vessel 1 (not shown), whereby an electrical connection between a electric power supply of the laboratory device 17 and the electrodes of the reaction vessel 1 is established. Thus, in contrast to some other embodiments of the present invention, electric power is supplied from the bottom rather than the top of the reaction vessel 1.

In this embodiment, the reaction vessel 1 comprises means for attaching the bottom of the reaction vessel 1 to the laboratory device. For example, as shown in FIG. 13, the reaction vessel 1 comprises one or more radial projections 36 at the bottom end which can be inserted into a corresponding recess 37 at the support surface 19. After insertion, by rotating the reaction vessel 1 with respect to the support surface 1, the projection 36 is moved into a radially extending cavity underneath the support surface 19, thereby fixing the reaction vessel 1 with respect to the support surface 1. For the sake of simplicity FIG. 13 illustrates only one projection 36 and one corresponding recess 37. However, it is envisaged that there may be two or more such projections and recesses, and/or alternative attachment means.

Figures 14A, 14B, 14C:
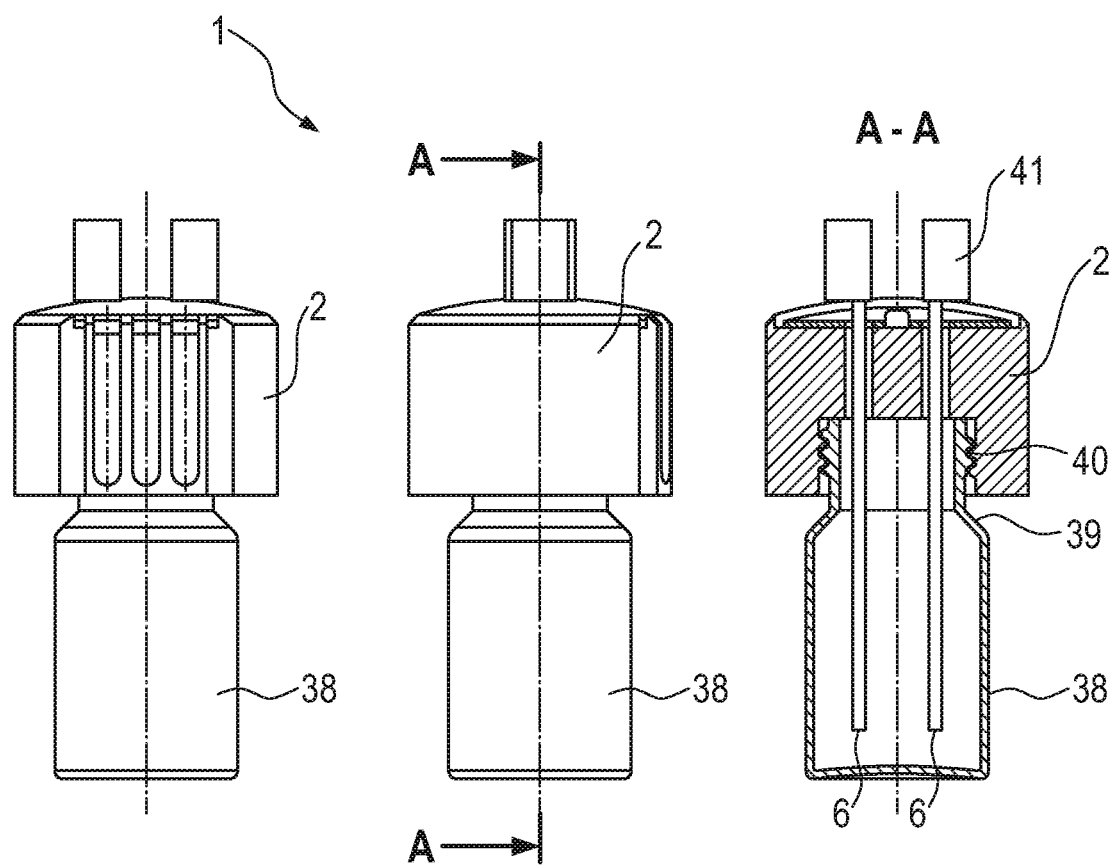
FIGS. 14a to 14c illustrate a electrochemical reaction vessel in accordance with another embodiment of the invention.

FIGS. 14a-14c illustrate the electrochemical reaction vessel 1 in accordance with another embodiment of the present invention. In this embodiment, the electrochemical reaction vessel 1 comprises a bottle-shaped receptacle 38 with a bottleneck 39 and an outer thread 40 onto which the closure 2 can be screwed. In an alternative embodiment, there is no thread 40 and the lid 2 is force-fitted to the receptacle 38.

The receptacle 38 may be implemented by standard "off-the-shelf" receptacles.

The electrodes 6 extend through the closure 2 into the inner volume of the receptacle 38. Handle portions 41 are attached to the top end of the electrodes 6. The handle portions 41 provide a stop when the electrodes 6 have reached their end position in the receptacle 38. Also, the handle portions 41 enable a user to grip the electrodes 6, for example when the electrodes 6 are to be replaced. Further, the handle portions each comprise an electrical connection, e.g. a socket, to which a power supply for the electrodes 6 can be connected.

REFERENCE NUMERALS

1 Electrochemical reaction vessel
2 Closure
3 Interior thread
4 Exterior thread
5 Electrode holder
6 Holding elements
7 Electrodes
8 Inner side of the closure
9 Interior of the vessel
10 Potentiostat
11 Contacts
12 Outer side of the closure
13 Hose connector
14 Closure
15 Bottom of the vessel
16 Projection
17 Laboratory device
18 Operating elements
19 Support surface
20 Holding and latch elements
21 Drive engine
22 Stirring magnet
23 Holder
24 Top portion of the holder
25 Recess
26 Adapter
27 Upper portion of the adapter
28 Lower portion of the adapter
29 Plug-in contacts
30 Magnets
31 Top portion of holder
32 Top portion of closure
33 Engagement surface of the closure
34 Engagement surface of the holder
35 Electrical contacts
36 Radial projection
37 Recess
38 Receptacle
39 Bottleneck
40 Outer thread
41 Handle portions
A Working electrodes
R Reference electrode

The invention claimed is:

1. Laboratory device comprising:
at least one electrochemical reaction vessel comprising a plurality of electrodes extending into an interior space of the reaction vessel, and a closure having a holder for holding the electrodes and first contacts arranged at an outer side of the closure for providing electrical contact with the electrodes from outside the reaction vessel; and
a reaction vessel holder or support for receiving the reaction vessel, wherein the reaction vessel holder or support comprises second contacts for electrically contacting the first contacts;
wherein the second contacts are arranged at a lateral surface of the reaction vessel holder or support to engage with the first contacts of the closure.

2. The laboratory device of claim 1, wherein the reaction vessel holder or support is adjustable for receiving a reaction vessel of different dimensions.

3. The laboratory device of claim 1, wherein the reaction vessel holder or support comprises a plurality of holding elements, each adjustable to receive a reaction vessel of different dimensions.

4. The laboratory device of claim 1, wherein the second contacts are spring-loaded contacts.

5. The laboratory device of claim 1, wherein the reaction vessel holder or support comprises a foldable member comprising the second contacts, the second contacts arranged in the foldable member to electrically contact the first contacts of the reaction vessel by folding the foldable member into an operating position.

6. The laboratory device of claim 1, wherein the reaction vessel holder or support comprises one or more magnets for attaching the reaction vessel to the reaction vessel holder or support.

7. The laboratory device of claim 1, further comprising a magnetic stirrer for mixing an electrolyte contained in the reaction vessel.

8. The laboratory device of claim 1, further comprising a control device connected or connectable to the electrodes via the first contacts, the control device configured to control electrochemical processes or reactions within the reaction vessel during operation of the laboratory device.

9. The laboratory device of claim 1, wherein the reaction device holder or support comprises a plurality of support surfaces each for receiving a respective reaction vessel or multi-vial adapter.

10. The laboratory device of claim 1, wherein the closure comprising one or more magnets for attaching the reaction vessel to the reaction vessel holder or support.

11. The laboratory device of claim 1, wherein the reaction vessel holder or support comprises a support surface for receiving the reaction vessel.

12. The laboratory device of claim 11, wherein the support surface and the reaction vessel comprise complementary means for attaching the reaction vessel to the support surface.

13. The laboratory device of claim 12, wherein the complementary means for the reaction vessel being located on the underside of the reaction vessel.

14. The laboratory device of claim 7, wherein the magnetic stirrer is included in the reaction vessel holder or supporter.

15. Laboratory device comprising:
- at least one electrochemical reaction vessel comprising a plurality of electrodes extending into an interior space of the reaction vessel, and a closure having a holder for holding the electrodes and first contacts arranged at an outer side of the closure for providing electrical contact with the electrodes from outside the reaction vessel; and
- a reaction vessel holder or support for receiving the reaction vessel, wherein the reaction vessel holder or support comprises second contacts for electrically contacting the first contacts;
- wherein the first contacts are arranged at a lateral surface of the closure to engage with the second contacts of the reaction vessel holder or support.

16. The laboratory device of claim 15, wherein the reaction vessel holder or support is adjustable for receiving a reaction vessel of different dimensions.

17. The laboratory device of claim 15, wherein the reaction vessel holder or support comprises a plurality of holding elements, each adjustable to receive a reaction vessel of different dimensions.

18. The laboratory device of claim 15, wherein the second contacts are spring-loaded contacts.

19. The laboratory device of claim 15, wherein the reaction vessel holder or support comprises a foldable member comprising the second contacts, the second contacts arranged in the foldable member to electrically contact the first contacts of the closure by folding the foldable member into an operating position.

20. The laboratory device of claim 15, wherein the reaction vessel holder or support comprises one or more magnets for attaching the reaction vessel to the reaction vessel holder or support.

21. The laboratory device of claim 15, further comprising a magnetic stirrer for mixing an electrolyte contained in the reaction vessel.

22. The laboratory device of claim 21, wherein the magnetic stirrer is included in the reaction vessel holder or supporter.

23. The laboratory device of claim 15, further comprising a control device connected or connectable to the electrodes via the first contacts, the control device configured to control electrochemical processes or reactions within the reaction vessel during operation of the laboratory device.

24. The laboratory device of claim 15, wherein the reaction device holder or support comprises a plurality of support surfaces each for receiving a respective reaction vessel or multi-vial adapter.

25. The laboratory device of claim 15, wherein the closure comprising one or more magnets for attaching the reaction vessel to the reaction vessel holder or support.

26. The laboratory device of claim 15, wherein the reaction vessel holder or support comprises a support surface for receiving the reaction vessel.

27. The laboratory device of claim 26, wherein the support surface and the reaction vessel comprise complementary means for attaching the reaction vessel to the support surface.

28. The laboratory device of claim 27, wherein the complementary means for the reaction vessel being located on the underside of the reaction vessel.

* * * * *